June 22, 1965 F. LITZKA 3,190,628
CUTTING APPARATUS FOR AN I-BEAM
Filed May 3, 1962 3 Sheets-Sheet 1
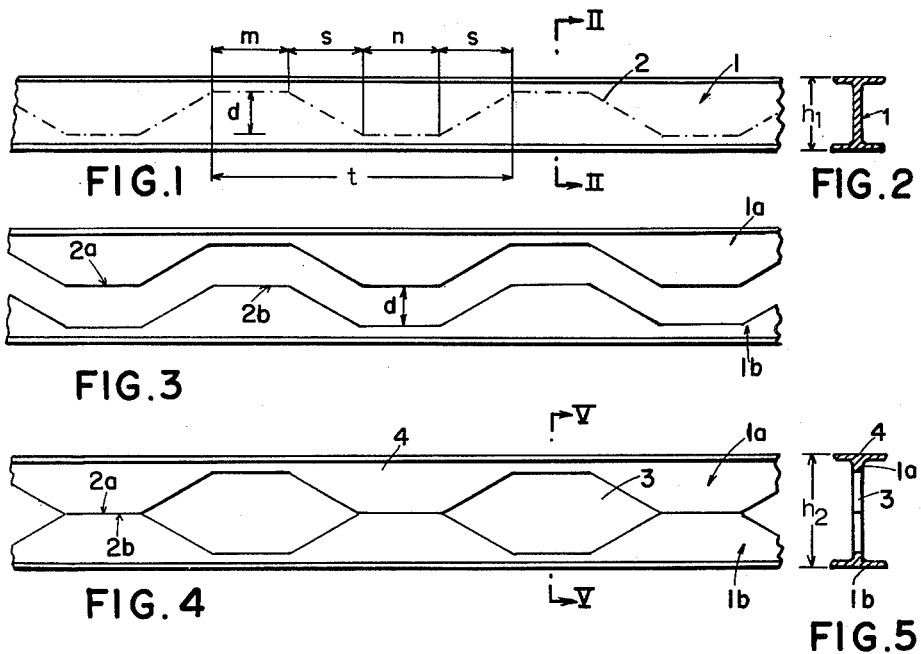
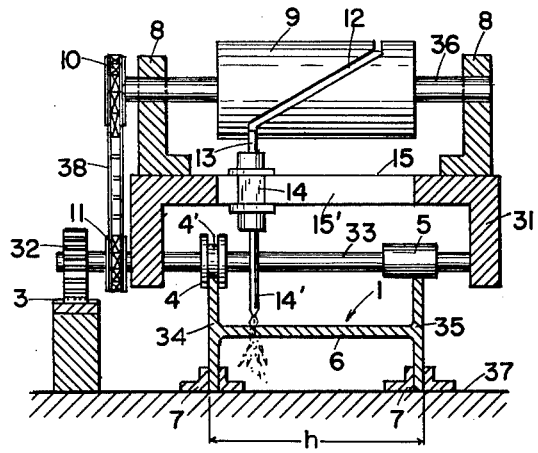
FIG.6
Franz Litzka
INVENTOR.
Mestern, Ross & Mestern June 22, 1965  F. LITZKA  3,190,628
CUTTING APPARATUS FOR AN I-BEAM
Filed May 3, 1962  3 Sheets-Sheet 2

Franz Litzka
INVENTOR.

Mestern, Ross & Mestern

June 22, 1965 F. LITZKA 3,190,628
CUTTING APPARATUS FOR AN I-BEAM
Filed May 3, 1962 3 Sheets-Sheet 3

Franz Litzka
INVENTOR.

Mestern, Ross & Mestern

United States Patent Office 3,190,628
Patented June 22, 1965

3,190,628
CUTTING APPARATUS FOR AN I-BEAM
Franz Litzka, Haus 3, Marktredwitz, Germany
Filed May 3, 1962, Ser. No. 193,073
4 Claims. (Cl. 266—23)

My present invention relates to an apparatus for producing deeply webbed honeycomb girders from solid I-beams.

This is a continuation-in-part of my copending application Serial No. 790,173, filed January 30, 1959, now U.S. Patent No. 3,066,394 and issued December 4, 1962. In my aforementioned copending application, I disclose apparatus for severing the web of an I-beam along an undulating repetitive pattern to produce separated beam portions which may then be relatively displaced longitudinally by a distance equal to half the period of the pattern and transversely by a distance equal to the depth of the pattern. The projecting web portions thus abut one another and may be welded together at their contacting edges. The result is a honeycomb girder whose flanges have the width of the I-beam from which it was derived and whose web has a width equal substantially to twice that of the I-beam. Such a girder has a higher loading capacity than the I-beam but attains the increased loading capacity without a material increase in weight. It has been found that honeycomb girders of this type have a substantially higher loading-capacity/weight ratio than do I-beams of the same linear dimensions and material.

The present invention has as its principal object the provision of an improved apparatus for the severing of an I-beam along its web in accordance with a predetermined pattern.

While it is known to provide an apparatus for severing elongated members with longitudinally and transversely effective means for displacing a cutting element (e.g. a cutting electrode or torch) in accordance with a predetermined pattern, such apparatus was not generally capable of reproducing similar patterns for elongated members of different dimensions. Thus, cam-operated cutting devices have been proposed heretofore in which a cam, rotated in step with the longitudinal displacement of the head, directly engaged the latter in order to impart transverse motion thereto. The entire apparatus required replacement if a similar pattern was to be formed by severing a larger or smaller elongated member into longitudinal portions. The high cost of preparing separate cams for each size and pattern were important factors in preventing widespread acceptance of the technique referred to.

It is another object of the invention to provide an apparatus for severing elongated members adapted to obviate the abovementioned disadvantages and to be readily adjusted for use with members of different sizes.

According to a feature of the present invention, I provide an apparatus of the character described which comprises a carriage displaceable longitudinally along an I-beam and a cutting head mounted on the carriage and adapted to sever the web, the head being displaceable in a direction transverse to the direction of displacement of the carriage. Advantageously, the carriage is provided with guide means for the cutting head which permits it to shift transversely under the control of a cam rotated in step with the longitudinal displacement of the carriage. The cam is preferably cylindrical and rotatable about an axis parallel to the web and transverse to the direction of carriage displacement.

According to a more specific feature of the invention, the cam is formed with an angularly undulating groove along its periphery directly engaging the cutting head for displacing it transversely in accordance with the pattern. The carriage is provided with positioning means engageable with a flange of the I-beam for positively locating the cutting head with respect to this flange. Advantageously, the positioning means comprises a pair of longitudinally spaced rollers engageable with the flange and journaled to the carriage along the corresponding side thereof. The carriage thus rides upon these rollers, which prevent relative lateral motion between the flange and the carriage, and another pair of rollers provided on the opposite side of the carriage. The other pair of rollers rest upon the other flange of the I-beam but do not positively prevent relative lateral motion between the carriage and this flange. The other rollers extend laterally over a relatively large distance so that the carriage may be disposed upon I-beams of varying web width with its positioning rollers embracing one of the I-beam flanges while the other or supporting rollers rest upon the other flange regardless of the width within the operative limits of the system.

According to another aspect of the invention, the cutting head is carried by a lever fulcrumed on the carriage and adapted to sweep across the web. The lever is provided with a follower engaging the cam so that the latter determines the pattern produced by the cutting head while the ratio of the distance between fulcrum and cutting head to the distance between fulcrum and follower determines the amplitude of the pattern. Advantageously, this ratio is adjustable, e.g. by shifting the cutting head toward or away from the fulcrum or by varying the distance between the latter and the follower, so that a single cam may be employed to produce similar patterns of different dimensions.

Yet a further feature of the invention resides in the provision of means for adjusting the rate of rotation of the cam with respect to the rate of displacement of the carriage along the I-beam for varying the period of the pattern. Such means may include a variable-speed transmission interposed between the carriage drive and the cam.

The above and other objects, features and advantages of the invention will become more readily apparent from the following description, reference being made to the accompanying drawing in which:

FIG. 1 is an elevational view of an I-beam adapted to be severed into longitudinal portions, according to the invention;

FIG. 2 is a cross-sectional view taken along line II—II of FIG. 1;

FIG. 3 is a view similar to FIG. 1 showing the longitudinal portions;

FIG. 4 is another view similar to FIG. 1 illustrating a finished honeycomb girder according to the invention;

FIG. 5 is a cross-sectional view taken along line V—V of FIG. 4;

FIG. 6 is a transverse cross-sectional view of a severing apparatus for cutting the I-beam of FIG. 1 along an undulating pattern;

Figure 7:
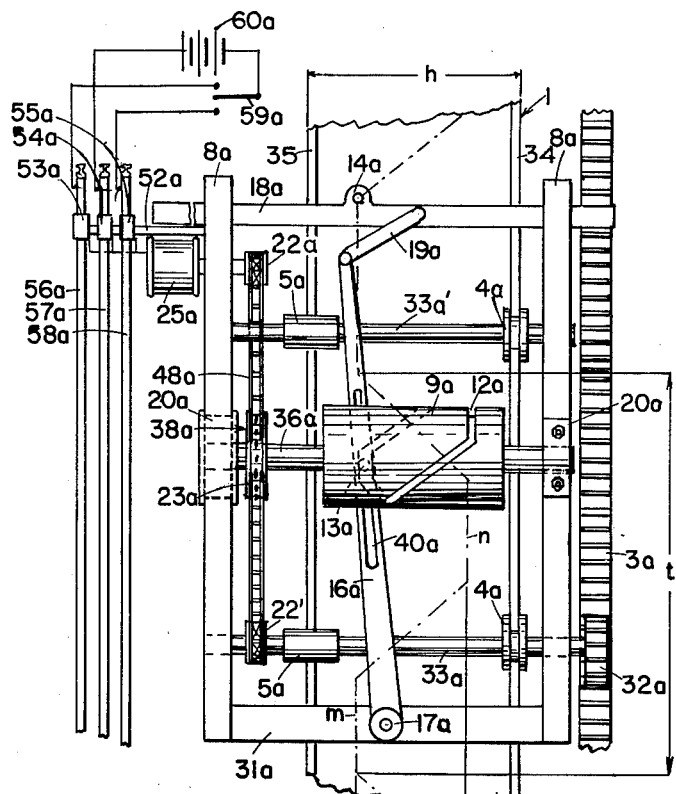
FIG. 7 is a plan view of another apparatus of this type.

The I-beam 1 shown in FIG. 1 is the starting member which, as previously described, may be severed along an angularly undulating pattern 2 (dot-dash lines) for division into two longitudinally extending portions. The repetitive pattern 2 consists of edge portions $m$ and $n$ of identical length which are parallel to each other and to the flanges of the I-beam. These edge portions are joined by upwardly and downwardly sloping portions $s$ also of identical length. Thus, the period or pitch $t$ of the pattern is equal to the sum of the lengths $m+n+2s$ where $m$, $n$ and $s$ are taken along the longitudinal extent of the beam. In FIG. 3, the I-beam 1 is shown to have been severed into its longitudinal portions 1a and 1b which have undulating edges 2a and 2b conforming to the pattern. The two portions have been separated transversely by the distance d which is equal to the depth of the teeth constituting the undulating edges. The portions 1a and 1b may then be offset in longitudinal direction by a distance equal to the length of one period of the undulating pattern, i.e. half the pitch t, thus causing the projecting edge surfaces to abut one another so that they may be welded together; between the welds at the edges 2a, 2b there are formed honeycomb-shaped spaces 3. The height $h_2$ of the resulting girder is, of course, equal to the sum $h_1+d$ where $h_1$ is the height of the original I-beam 1 and d is the depth of the teeth formed. It is possible to design the undulating pattern so that $h_2$ is approximately equal to $2h_1$, in which case a substantial increase of the loading capacity is achieved without any increase in weight. The girder may have any of the modified forms disclosed in my above-identified copending application.

In FIG. 6 I show one embodiment of an apparatus for severing the web 6 of I-beam 1 along the undulating pattern 2. The apparatus comprises a carriage 31 which is displaceable upon the rails formed by the flanges 34, 35 of the I-beam 1; the latter is fastened in a horizontal position to the bed 37 of the apparatus by clamps 7 engaging these flanges. A rack 3 extends longitudinally alongside the beam 1 and is positively engaged by a pinion 32 keyed to the drive axle 33 of the carriage. The axle, which is journaled in the carriage 31, also carries a positioning wheel or roller 4 provided with a groove 4' adapted to receive the flange 34 and thus positively to position the carriage with respect to the I-beam while preventing relative lateral motion. Another roller 5 is carried by the axle 33 and rests upon the other flange 35 without, however, positively engaging it. Roller 5 has an axial length sufficient to span a substantial portion of the transverse width of the carriage whereby, with the positioning roller 4 always in positive engagement with a respective flange, I-beams of different heights h may be accommodated by the carriage. The latter is also provided with a cross-bar 15 whose slot 15' extends transversely across the I-beam 1 and forms guide means for a cutting head 14. This head may be equipped with a gas cutting torch 14' or some other appropriate cutting element (e.g. a so-called "saber" saw, an arc cutting electrode or the like) and is shiftable in the guide slot 15'. Carriage 31 also supports a pair of upstanding brackets 8 in which a cam shaft 36 is journaled, preferably, directly above the head 14. The cam shaft 36 bears a cylindrical cam 9 whose closed peripheral cam slot 12 conforms to at least one period of the undulating pattern 2. A follower 13 on cutting head 14 extends upwardly into engagement with the cam slot 12. To rotate the cam shaft 36 in step with the displacement of carriage 31 along the beam 1, a transmission is provided to couple the drive axle 33 with cam shaft 36. This transmission comprises a sprocket wheel 10 secured to the cam shaft 36, another sprocket wheel 11 secured to the drive shaft 33 and a chain 38 interconnecting the two wheels for synchronous rotation.

In operation, the carriage 31 is displaced along the I-beam 1 in longitudinal direction, whereupon a rotation of pinion 32 as the carriage is moved relatively to the stationary rack 3 is transmitted via the transmission 10, 38, 11 to the shaft 36 whose cylindrical cam 9 rotates in step with the longitudinal displacement of the carriage. The cutting head 14 is, simultaneously, displaced by the cam 9 transversely to the direction of displacement of the carriage so that its cutting element 14' describes the undulating pattern 2 and severs the web 6 of the I-beam in accordance with this pattern. While the carriage may be manually displaced in longitudinal direction, it may be advantageous to equip it with a source of motive power. The latter may comprise a motor mounted on the cutting-head carriage for rotating one or more drive wheels or an independent driving carriage coupled to the cutting-head carriage as will be described hereinafter. Moreover, neither carriage need be shiftable upon the I-beam, it being only necessary that the cutting-head carriage be displaceable along the latter. Thus, rail means may be provided alongside the I-beam for the cutting-head carriage which would then be provided with a transversely shiftable member extending over the I-beam and carrying the cutting head.

In FIG. 7 I show a somewhat modified form of the apparatus of FIG. 6. The carrier 31a of the modified device is provided with a drive axle 33a and an auxiliary axle 33a' whose rollers 4a, 5a ride upon the flanges 34, 35 of an I-beam 1 as previously described. The carriage 31a also supports a cam shaft 36a, which is linked by a transmission 38a with drive axle 33a, carrying the cylindrical cam 9a. A guide lever 16a is swingably mounted on the carriage 31a at its fulcrum 17a for angular motion about a vertical axis and, at its free end, is articulatedly connected to a slide 18a, displaceable transversely to the direction of displacement of the carriage in the brackets 8a, via a link 19a pivoted to the lever 16a and the slide 18a. The latter carries, at 14a, a cutting head of the type referred to. A follower pin 13a on lever 16a engages the camming groove 12a of the cam 9a. It will be apparent that, for any given ratio of the fulcrum/ follower-pin and fulcrum/cutting-head distances, the pattern carried by cam 9a will be reproduced in severing the web 6 with a predetermined amplitude d. To vary the aforementioned ratio, in order to change the amplitude of the undulations, I provide the brackets 8a with a longitudinally extending slot 21a in which the cam shaft 36a is shiftable whereby it may be selectively clamped at different positions with respect to fulcrum 17a by a lock 20a. The lever 16a may be provided with a slot 40a in which the follower pin 13a may be shifted so as to be positioned directly below the axis of cam 9a. The pin 13a may be locked at any position within its slot with the aid of any conventional means, e.g. a nut 41a. To insure a positive drive for the cam shaft 36a in all positions of the latter, the transmission 38a may include a pair of sprocket idler wheels 22a, 22a' over which the chain 48a passes while undershooting the sprocket wheel 23a of the cam shaft 36a. Whereas the transmission shown in FIG. 7 connects the cam shaft with the drive axle, it should be noted that the drive of the cam shaft may be effected, as shown in FIG. 8, by a further wheel 49a frictionally engaging a flange of the I-beam while having a sprocket wheel in engagement with the chain.

Figure 8:
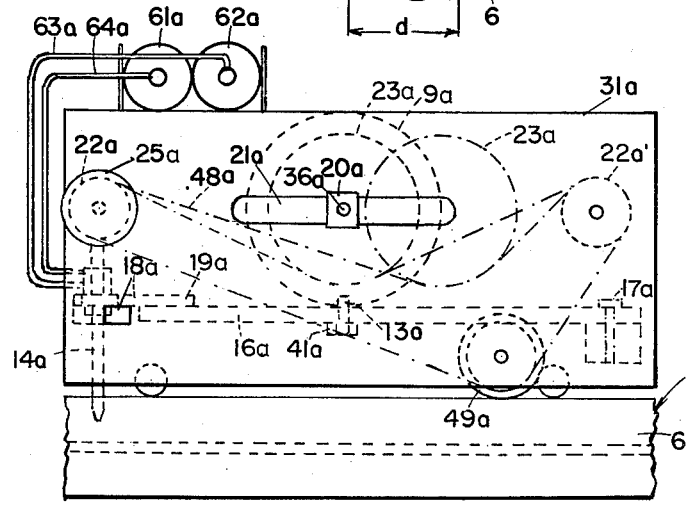
FIG. 8 is a side-elevational view of the apparatus of FIG. 7.

In general, of course, the device shown in FIGS. 7 and 8 functions similarly to that shown in FIG. 6 with the exception that the amplitude or depth of the undulating pattern may be readily adjusted without replacement of the cam. It is also possible to vary the period t of the pattern by interposing a variable-speed transmission between the driving element and the cam shaft of the respective apparatus. The variable-speed transmission may be of the well-known stepped or stepless types. Instead of displacing the cam shaft 36a relative to the brackets 8a to vary the lever ratio as previously described, it will be apparent that the brackets 8a and the cam shaft 36a may, by a minor modification, be shifted as a unit with respect to the fulcrum 17a.

It will also be apparent that a single carriage 31 or 31a can be used to carry a plurality of cutting heads 14 or 14a for severing the webs of a plurality of I-beams. As is disclosed in my copending application referred to above, the several I-beams may lie alongside one another with their juxtaposed flanges secured in abutting relationship. To drive the carriage 31a, I provide a motor 25a which is mounted upon one of the brackets 8a and rotates the rollers 22a, as seen in FIG. 8, to drive the friction wheel 49a or the cam shaft 36a, the latter, in turn, driving the pinion 32a as shown in FIG. 7. To permit remote control of the motor 25a, the carriage 31a is provided with a contact arm 52a whose shoes 53a, 54a and 55a bear upon respective conductive rails 56a, 57a, 58a for electrically connecting these rails or bus bars with the motor. A reversing switch 59a is adapted to connect the bus bars 56a and 58a, alternatively, with one pole of a source 60a of electric current while the rail 57a is connected to the other pole of the source, thereby permitting the switch to reverse the motor 25a so that the carriage 31a may be driven in either forward or reverse direction along the I-beam. The switch is also provided with a neutral position wherein the motor 25a is deenergized. It is also possible to use the rack 3 as one of the contact rails.

If the cutting element is, for example, an oxy-acetylene torch or a similar gas-operated cutter, the requisite gas tanks 61a, 62a are advantageously mounted upon the carriage 31a (FIG. 8) and connected with the cutting torch 14a by tubes 63a, 64a.

Figure 9:
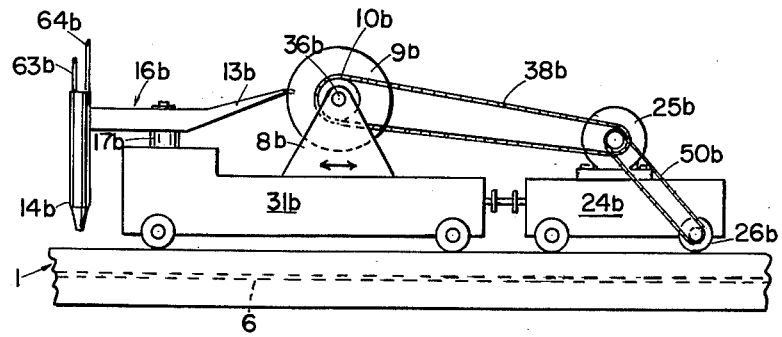
FIG. 9 is a view similar to FIG. 8 of yet another apparatus according to the invention.
Figure 10:
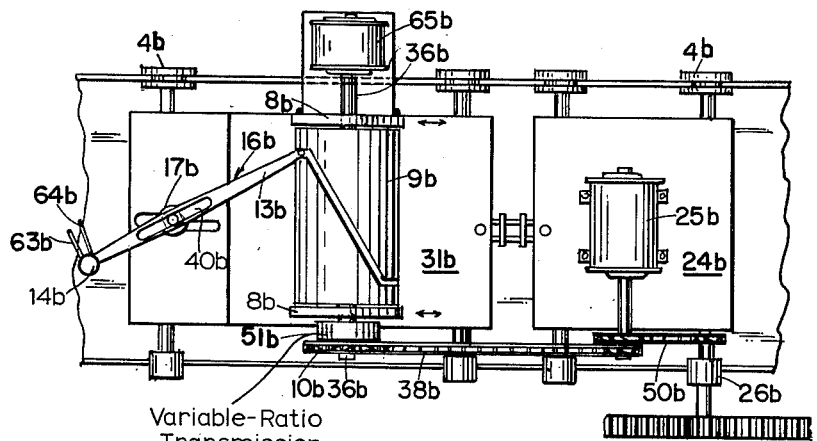
FIG. 10 is a plan view of the apparatus of FIG. 9.

In the embodiment shown in FIGS. 9 and 10, the cutting-head carriage 31b is independent from but linked to a driving carriage 24b. The latter supports a motor 25b whose chain 50b drives the wheel 26b. This wheel rides along a flange of the I-beam and is preferably secured to a pinion in engagement with a rack as illustrated in FIGS. 6 and 7 to effect positive registration of the carriage with the beam. The cutting-head carriage 31b has its cam 9b together with its shaft 36b journaled between the upright brackets 8b. A variable-speed transmission 51b is interposed between the sprocket wheel 10b and shaft 36b for driving the latter at selectively adjustable rates relative to the speed of motor 25b. A chain 38b interconnects the latter and sprocket wheel 10b. A double-arm lever 16b engages with one extremity 13b the groove of cam 9b while its other extremity carries the cutting head 14b. The lever 16b is swingably mounted for rotation about its vertical axis upon an upright stud 17b which is shiftable relatively to the lever 16b in a slot 40b therein to alter the fulcrum/follower and fulcrum/cutting-head distance ratio.

While the apparatus shown in FIGS. 9 and 10 operates generally in the manner described with respect to FIGS. 6–8, it should be noted that the period of the pattern can also be varied if the cam 9b is rotated independently from the drive for displacing the carriage 31b. To this end, the carriage is provided with a motor 65b for driving cam shaft 36b and the chain 38b is dispensed with. Thus, motor 25b displaces the carriages in longitudinal direction and may be a constant-speed synchronous motor, while the motor 65b, which drives the cam 9b and periodically displaces the lever 16b, may be a variable-speed motor or provided with a reversing switch of the type shown at 59a for controlling the period and maintaining the speed of the cutting head constant along its path. Alternatively, motor 25b may be a variable-speed motor or provided with a variable-speed transmission to permit reduction of the rate of travel of the carriages when the cutting head 14b is severing the I-beam web along the portions m and n parallel to the flanges. Thus, these portions may be cut at a relatively slow and constant speed to insure linearity and facilitate welding of the severed portions together at the edges formed. The two-motor arrangement can also be employed with the carriages 31 and 31a. In general, the relative speeds of the two motors are such that the cutting head 14, 14a, 14b travels at a constant velocity along its cutting path 2 regardless of the location along the path.

It will be apparent that many modifications and substitutions of elements where compatible are possible with the apparatus described and illustrated, all such modifications and variations being deemed included within the spirit and scope of the invention claimed.

I claim:

1. An apparatus for severing the generally horizontal web of an I-beam along an undulating pattern, comprising:
   carriage means displaceable longitudinally upon said I-beam and having first and second wheel means rollingly engaging opposite flanges of said I-beam, respectively, for supporting said carriage means upon said I-beam;
   a cylindrical groove cam journaled on said carriage means and formed with an endless peripheral undulating camming channel, said cylindrical groove cam having an axis of rotation extending generally parallel to said web and transversely to the direction of displacement of said carriage means;
   a lever fulcrumed on said carriage means for pivotal movement generally parallel to said web at a pivotal portion having an axis transverse to said web and having a cam-follower portion slidably engaging said groove;
   web-severing means mounted upon a further portion of said lever remote from said pivotal and cam-follower portions for displacement by said lever across said web to describe an undulating pattern conforming to that of said channel;
   pattern-amplitude-adjusting means at one of said pivotal and cam-follower portions for varying concurrently both the distance between said pivotal portion and said other portion and the distance between said cam-follower portion and said other portion, thereby regulating the ratio between said distances and controlling the amplitude of the pattern obtainable with said cylindrical groove cam; and
   drive means including a variable-ratio transmission interconnecting said cam and one of said wheel means for concurrently displacing said carriage means along said I-beam and rotating said cam, said cam being rotatable at selectively variable rates relative to the rate of displacement of said carriage means by said transmission for controlling the period of undulation of said pattern.

2. An apparatus for severing the generally horizontal web of an I-beam along an undulating pattern, comprising:
   carriage means displaceable longitudinally upon said I-beam and having first and second wheel means rollingly engaging opposite flanges of said I-beam, respectively, for supporting said carriage means upon said I-beam, one of said wheel means being flanged for lateral engagement with the respective flange to prevent lateral shifting of said carriage means upon said I-beam, the other of said wheel means being substantially cylindrical and unprofiled transverse to the direction of displacement of said carriage means for accommodating I-beams of different widths beneath said carriage means;
   a cylindrical groove cam journaled on said carriage means and formed with an endless peripheral undulating camming channel, said cylindrical groove cam having an axis of rotation extending generally parallel to said web and transversely to the direction of displacement of said carriage means;
   a lever fulcrumed on said carriage means for pivotal movement generally parallel to said web at a pivotal portion having an axis transverse to said web and having a cam-follower portion slidably engaging said groove;
   web-severing means mounted upon a further portion of said lever remote from said pivotal and cam-follower portions for displacement by said lever across said web to describe an undulating pattern conforming to that of said channel;
   pattern-amplitude-adjusting means at one of said pivotal and cam-follower portions for varying concurrently both the distance between said pivotal portion and said other portion and the distance between said cam-follower portion and said other portion, thereby regulating the ratio between said distances and controlling the amplitude of the pattern obtainable with said cylindrical groove cam; and drive means including a variable-ratio transmission interconnecting said cam and one of said wheel means for concurrently displacing said carriage means along said I-beam and rotating said cam, said cam being rotatable at selectively variable rates relative to the rate of displacement of said carriage means by said transmission for controlling the period of undulation of said pattern.

3. An apparatus for severing the generally horizontal web of an I-beam along an undulating pattern, comprising:

carriage means displaceable longitudinally upon said I-beam and having first and second wheel means rollingly engaging opposite flanges of said I-beam, respectively, for supporting said carriage means upon said I-beam;

a cylindrical groove cam journaled on said carriage means and formed with an endless peripheral undulating camming channel lying entirely along a cylindrical surface, said cylindrical groove cam having an axis of rotation extending generally parallel to said web and transversely to the direction of displacement of said carriage means;

a lever fulcrumed on said carriage means for pivotal movement generally parallel to said web at a pivotal portion having an axis transverse to said web and having a cam-follower portion slidably engaging said groove;

web-severing means mounted upon a further portion of said lever remote from said pivotal and cam-follower portions for displacement by said lever across said web to describe an undulating pattern conforming to that of said channel;

pattern-amplitude-adjusting means at one of said pivotal and cam-follower portions for varying concurrently both the distance between said pivotal portion and said other portion and the distance between said cam-follower portion and said other portion, thereby regulating the ratio between said distances and controlling the amplitude of the pattern obtainable with said cylindrical groove cam; and drive means including a variable-ratio transmission interconnecting said cam and one of said wheel means for concurrently displacing said carriage means along said I-beam and rotating said cam, said cam being rotatably at selectively variable rates relative to the rate of displacement of said carriage means by said transmission for controlling the period of undulation of said pattern.

4. An apparatus for severing the generally horizontal web of an I-beam along an undulating pattern, comprising:

carriage means displaceable longitudinaly upon said I-beam and having first and second wheel means rollingly engaging opposite flanges of said I-beam, respectively, for supporting said carriage means upon said I-beam, one of said wheel means being flanged for lateral engagement with the respective flange to prevent lateral shifting of said carriage means upon said I-beam, the other of said wheel means being substantially cylindrical and unprofiled transverse to the direction of displacement of said carriage means for accommodating I-beams of different widths beneath said carriage means;

a cylindrical groove cam journaled on said carriage means and formed with an endless peripheral undulating camming channel lying entirely along a cylindrical surface, said cylindrical groove cam having an axis of rotation extending generally parallel to said web and transversely to the direction of displacement of said carriage means;

a lever fulcrumed on said carriage means for pivotal movement generally parallel to said web at a pivotal portion having an axis transverse to said web and having a cam-follower portion slidably engaging said groove;

web-severing means mounted upon a further portion of said lever remote from said pivotal and cam-follower portions for displacement by said lever across said web to describe an undulating pattern conforming to that of said channel;

pattern-amplitude-adjusting means at one of said pivotal and cam-follower portions for varying concurrently both the distance between said pivotal portion and said other portion and the distance between said cam-follower portion and said other portion, thereby regulating the ratio between said distances and controlling the amplitude of the pattern obtainable with said cylindrical groove cam, and drive means including the variable-ratio transmission interconnecting said cam and one of said wheel means for concurrently displacing said carriage means along said I-beam and rotating said cam, said cam being rotatable at selectively variable rates relative to the rate of displacement of said carriage means by said transmission for controlling the period of undulation of said pattern.

References Cited by the Examiner

UNITED STATES PATENTS

| 2,177,395 | 10/39 | Thompson et al. | 269—184 |
| 2,490,119 | 12/49 | Edinger | 266—23 |
| 2,630,078 | 3/53 | Euwer | 105—1 |
| 2,661,783 | 12/53 | Caston | 269—154 |
| 2,726,617 | 12/55 | Knapp | 113—132 |
| 2,726,620 | 12/55 | Meissner | 113—133 |

BROUGHTON G. DURHAM, *Primary Examiner.*